Aug. 16, 1927.

J. LUKS ET AL 1,639,262

DENTAL MOLD

Filed March 26, 1926    3 Sheets-Sheet 1

Inventors

Joachim Luks,
James Mercer Garnett,

By James P. Duhamel,

Attorney

Aug. 16, 1927. 1,639,262

J. LUKS ET AL
DENTAL MOLD
Filed March 26, 1926 3 Sheets-Sheet 2

Inventors
Joachim Luks,
James Mercer Garnett,
By James T. Duhamel,
Attorney

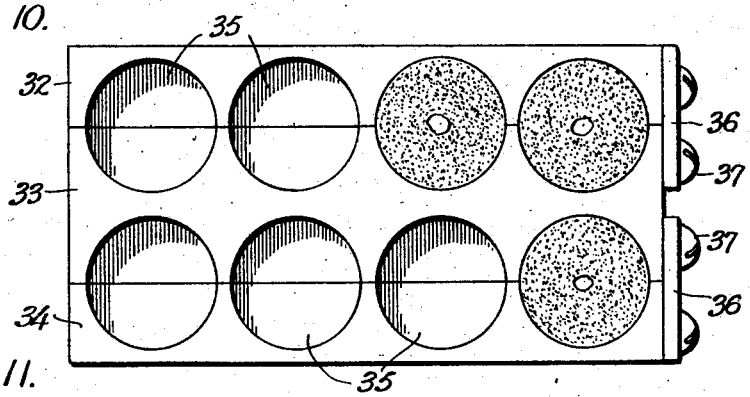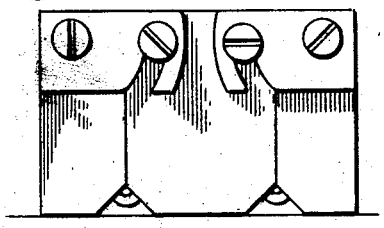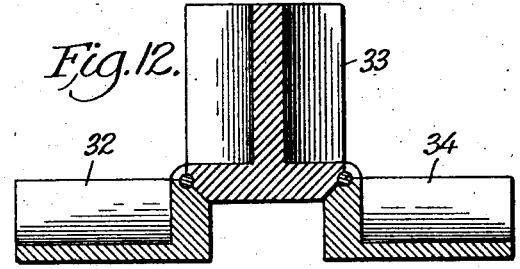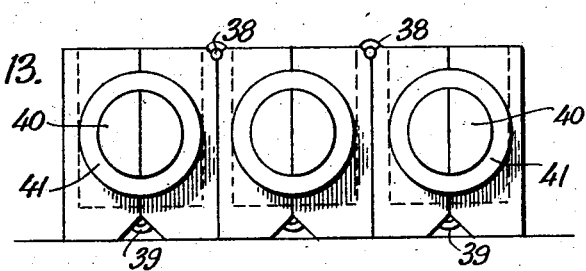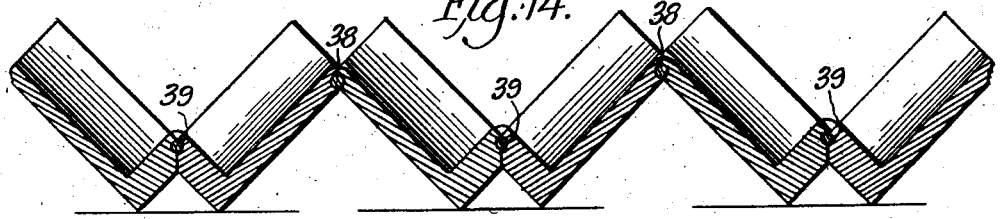

Patented Aug. 16, 1927.

1,639,262

UNITED STATES PATENT OFFICE.

JOACHIM LUKS AND JAMES MERCER GARNETT, OF BROOKLYN, NEW YORK.

DENTAL MOLD.

Application filed March 26, 1926. Serial No. 97,761.

This invention relates to dental molds and more especially to molds adapted to contain a plastic material in one or more recesses and in which the impression of the denture is made. The mold being divided and the several sections hinged together, the object of the same being to break the plastic material on the dividing line so that the denture may be removed and a cast of it made upon which a crown or other work can be devised. One or more of the hinged sections carry latches to engage studs on the other sections to hold the mold in its closed relation or when opened a patch may be used as a support for the sections in their open relation.

These and other objects and details of the invention are more fully described in the following specification, set forth in the appended claims and illustrated in the accompanying drawings, wherein:

Fig. 10 is a plan view of another modified form.

Fig. 11 is an end view of same.

Fig. 12 is a cross sectional view of same opened.

Fig. 13 shows the mold divided into a greater number of sections.

Fig. 14 is a sectional cross sectional view of same opened for access to the pockets.

The ultimate object of the invention is the production of seamless crowns for teeth and which are formed on a cast or die of hard plastic material such as plaster of Paris adapted to be produced in the improved mold.

The device consists of two identical sections of cast metal 10 and 11 that are hinged at the bottom or lower face by means of the ordinary hinge 12 each butt of same being secured to a section.

Figure 1:
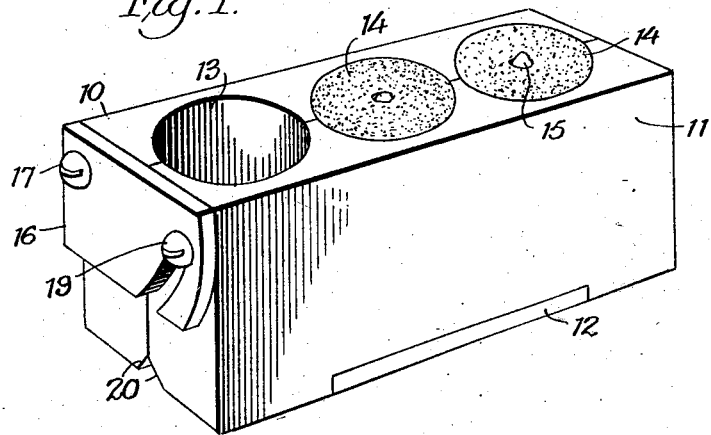
Fig. 1 is a perspective view of the mold in its operative position and showing the casts being made.

When the two sections are closed, as shown in Fig. 1, several pockets 13 are provided and formed equally and identically as halves in each section and which are adapted to receive a soft and pliable material 14 that will readily receive the impression of a tooth and retain same after the tooth is removed and the material for the die is poured into the cavity that remains.

After the pliable material 14 is inserted in a pocket of the closed mold and the denture 15 inserted and the material tamped it will be necessary to divide the pliable material equally so the tooth may be removed without disturbing or injuring its mold. In opening and separating the two sections the material 14 will separate so as to make an equal division on each side or a knife or tool may be used to accomplish same.

The tooth 15 may now be removed from the half in which it remains and to make the die the sections are now closed ready for the casting of the die.

When the die has been in the mold long enough to set, it is removed and the material 14 may be worked over to prepare it for another mold and die.

An important adjunct to the mold is the latch 16 that is pivoted to the section 10 at one end by the stud 17 and which has an arcuate slot 18 whose centre is the stud 17 and that engages the stud 19 on the corresponding end of the section 11. When the latch is in operation it securely locks the two sections so that the mold for the die may be made.

The separation of the mold is a delicate operation and it is advantageous that the mold be so located and positioned as to be readily accessible.

Figure 2:
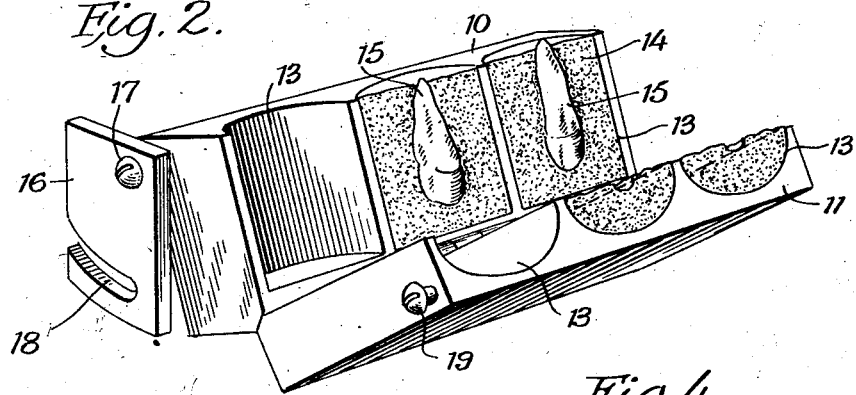
Fig. 2 is a perspective view of the device opened and the plastic mold separated.
Figure 3:
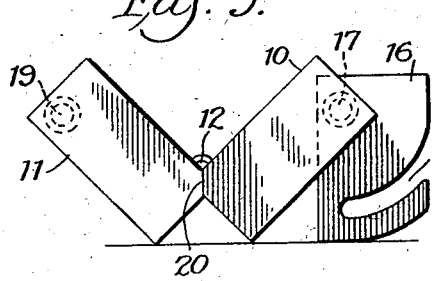
Fig. 3 is an end view of the device opposite to the end shown in the above views.
Figure 4:
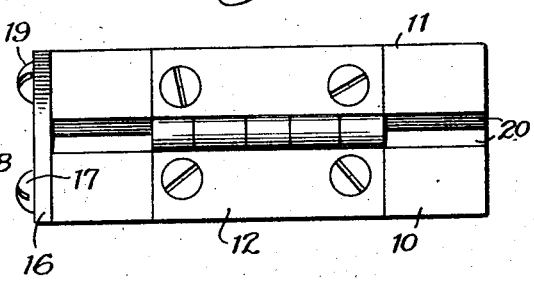
Fig. 4 is a bottom plan view of the mold.

This preferred position is shown in Fig. 2 where it will be seen that the latch is thrown back to act as a support for the section 10 and as the closure edges 20 at the base of the sections are bevelled and fit together closely when the said sections are thrown open at an angle of 45 degrees.

The butts of the hinge are countersunk in the sections so that the bottom of the mold is smooth and affords a solid foundation.

The pockets 13 may be used singly or all may be used at the same time in securing the dies but it is desirable that all be separated at the same time to remove he dentures.

In preparing the molds the teeth are located head down so that when the casts are made the material at the most important point carries the weight of the material above and renders it more solid and compact, preventing contraction of same and ensuring correctures of the crown, while any number of pockets can be employed and a quantity of dies made at one time.

In devices of this nature where a plurality of pockets is necessary this means is provided by the modified forms of construction shown in Figs. 5 to 14 where novel connections are also shown for the hinged sections and the pockets arranged so that a number may be provided in a very limited space to secure the molds and dies.

Figure 5:
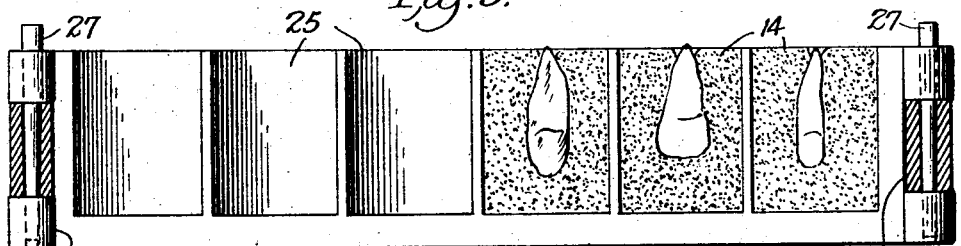
Fig. 5 shows a longitudinal sectional view through a modified form of mold.
Figure 6:
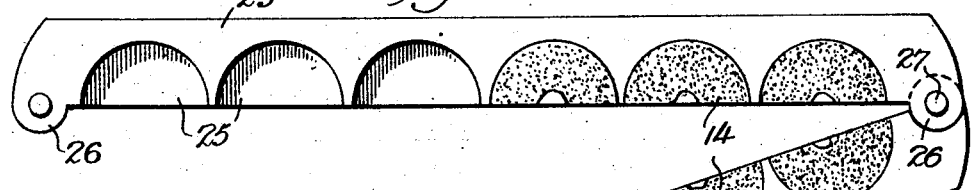
Fig. 6 is a plan view of the same opened.

The construction in Figs. 5 and 6 provides for an elongated structure made up of the two sections 23 and 24 which when closed, forms the pockets 25 for the molds. The two sections are provided with hinge members 26 at each end and pintles 27 that may be used one at a time, as the hinge, while the other effects the closure. When the sections are opened they ensure the retension of the molds in their upright position.

Figure 7:
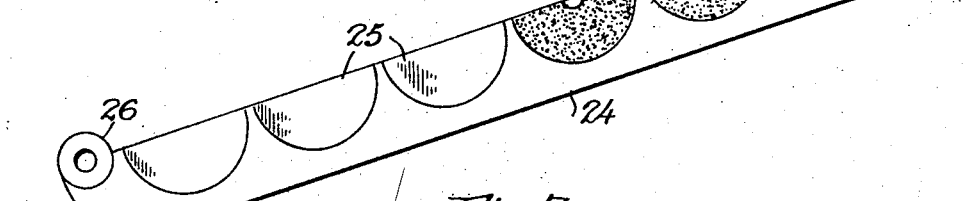
Fig. 7 is a plan view of a mold having locking rings.
Figure 7:
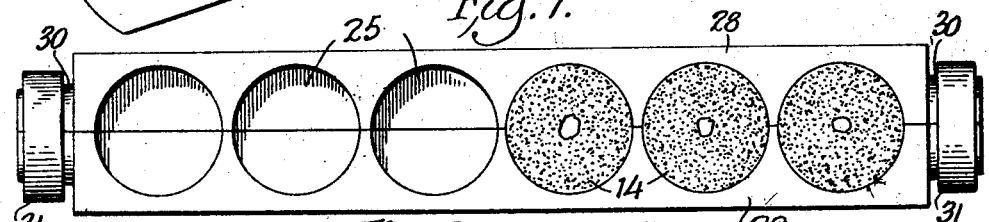
Figure 8:
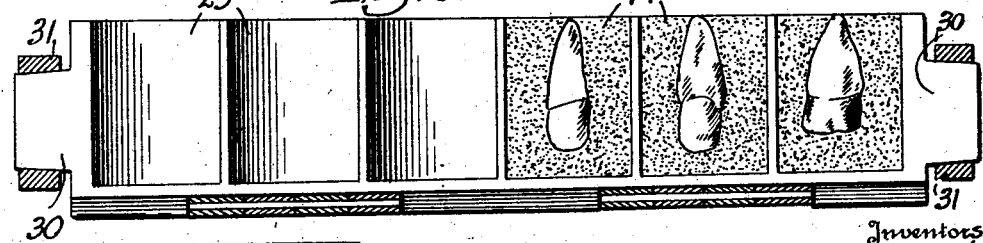
Fig. 8 is a longitudinal vertical sectional view of the same.
Figure 9:
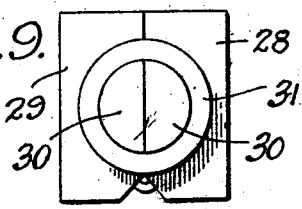
Fig. 9 is an end view of the latter form of mold.

The arrangement of the sections shown in Figs. 7 to 9 reverts to the location of the hinge at the bottom of the sections so they may be opened and supported at an angle of forty-five degrees. The sections 28 and 29 have at each end semi-cylindrical studs 30 slightly tapering to receive a ring 31 that unites the sections while the mold is being prepared.

A more compact form of structure is shown in Figs. 10, 11 and 12 and where it will be seen that it is divided into three sections 32, 33 and 34 with the lines of division through the centres of a plurality of pockets 35 and having hinges at their lower sides. The sections are locked together by the latches 36 that engage the studs 37 and when the molds are opened they will take the position shown in Fig. 12, half of the molds assuming the upright position while the remaining portion lies flat.

This latter construction provides for two rows of pockets but the number may be further increased in the compact structure shown in Figs. 13 and 14 where six sections are shown hinged together, the hinges 38 uniting certain sections at the top while hinges 39 unite them at their lower sides.

This construction may also be provided with the divided studs 40 to be held together by the ring 41 and when the sections are freed and separated they may be spread out as shown in Fig. 14 so that the molds are safe and accessible.

By these arrangements the molds may be opened and divided to free the model tooth with little danger of loosening the mold section and endangering it preparatory to casting the die.

It is obvious that the parts may be otherwise arranged and modified without departing from the essential features above described and from the scope of the appended claims.

What we claim as new is:

1. In dental molds, the combination of identical sections having corresponding recesses adapted to form pockets, a bevelled edge to each section and below the recesses, hinged members adjacent the bevelled edges, and a latch adapted to secure the sections together or to support the open mold in an upright position.

2. In dental molds, the combination of identical sections having recesses adapted when the sections are closed together to form mold pockets, bevelled edges to the sections and below the recesses, hinges uniting opposite sections, and means for supporting the sections in a substantially upright position while opened.

3. In dental molds, the combination of a mold comprising a plurality of sections having oppositely disposed recesses to constitute pockets, hinges uniting the sections, bevelled edges at the hinged sides of the sections and permitting the opening of the sections on the hinges a predetermined distance, and means for supporting the sections in an upright position when open or to lock them together when closed.

4. In dental molds, the combination of a mold comprising a plurality of sections having oppositely disposed recesses, hinges at the lower side of the sections, bevelled edges adjacent the hinges and adapted to permit the opening of the sections sufficiently to afford access to the recesses, a stud on one of the sections, and a latch on the adjacent section adapted to engage the stud to lock the sections together when closed or to act as a leg and support the mold in an upright position when the sections are opened.

In testimony whereof we hereunto affix our signatures.

JOACHIM LUKS.
JAMES MERCER GARNETT.